United States Patent [19]

Gulati

[11] 4,323,614
[45] Apr. 6, 1982

[54] CERAMIC HONEYCOMB STRUCTURE

[75] Inventor: Suresh T. Gulati, Elmira, N.Y.

[73] Assignee: Corning Glass Works, Corning, N.Y.

[21] Appl. No.: 672,155

[22] Filed: Mar. 31, 1976

[51] Int. Cl.³ .............................................. B32B 3/12
[52] U.S. Cl. .................................... 428/116; 156/89;
428/118; 428/174
[58] Field of Search .................... 428/116, 118, 174;
156/197, 89; 23/288 R, 288 F, 288 FC;
106/39.5; 252/477 R

[56] References Cited

U.S. PATENT DOCUMENTS 3,903,341  9/1975  Gerhold .............................. 428/116

Primary Examiner—Paul J. Thibodeau
Attorney, Agent, or Firm—Burton R. Turner

[57] ABSTRACT

A ceramic honeycomb structure having cells which deform in a preinduced manner under stress is disclosed. Each of the cells is formed by interconnected convexly and concavely curved partitions, the cross-sectional profile of each of the curved partitions preferably being a half sine wave. Thermally induced stresses exerted in planes normal to the honeycomb axis will cause the concave partitions to bow inwardly and the convex partitions to bow outwardly, whereby the corner angles between partitions will remain generally equal to their original values.

3 Claims, 8 Drawing Figures

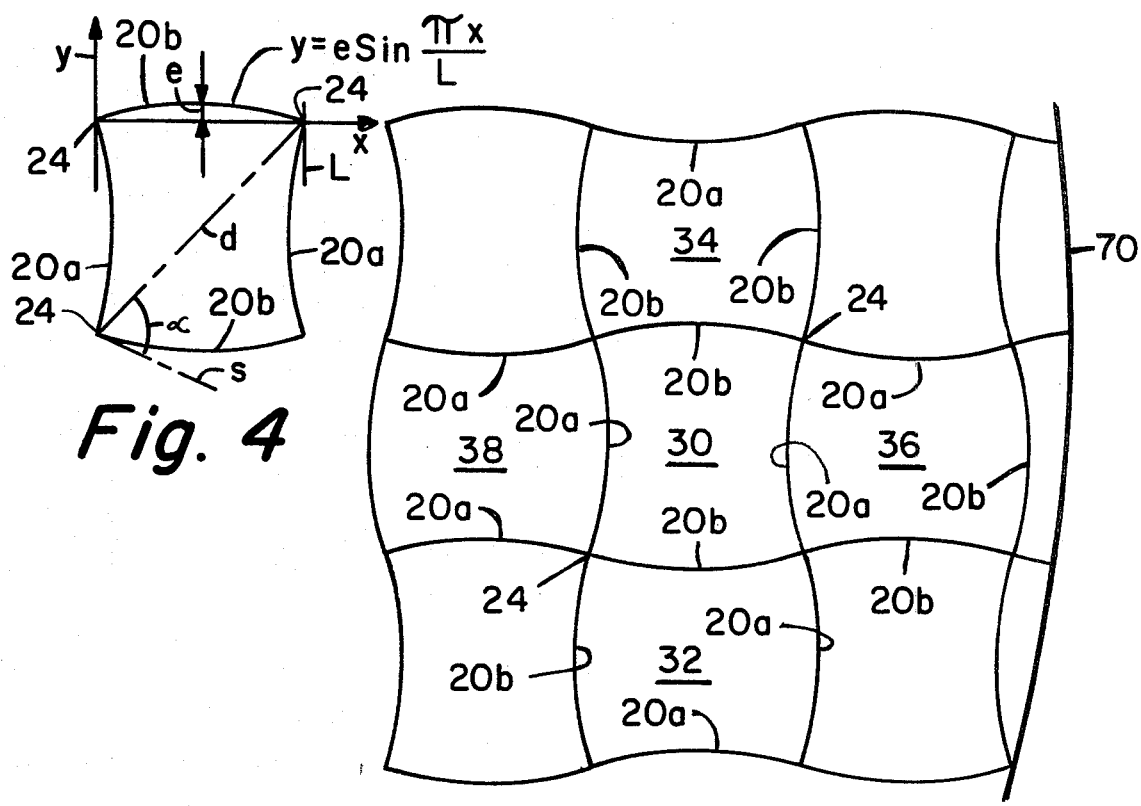
Fig. 4
Fig. 3
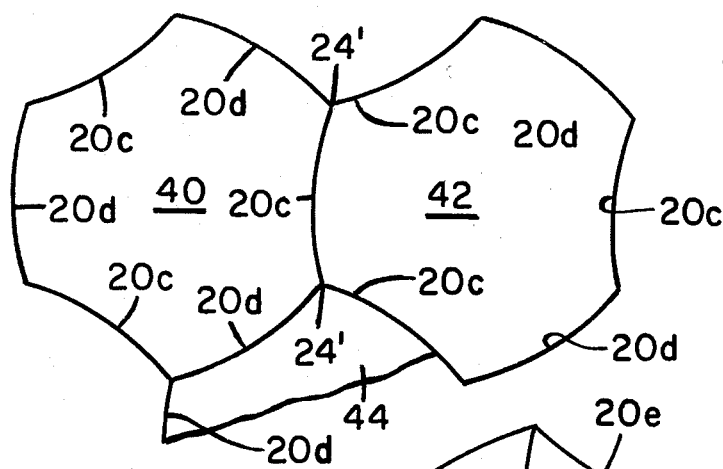
Fig. 5
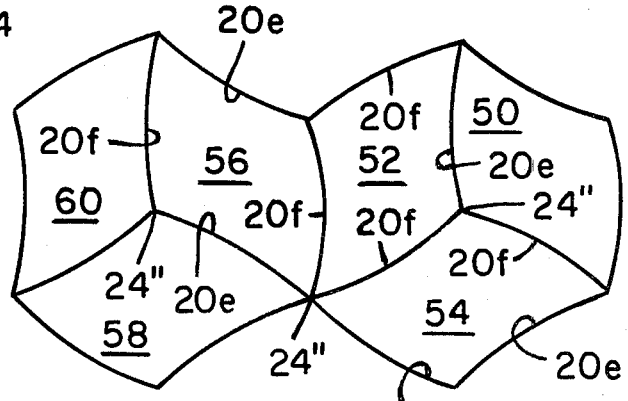
Fig. 6

CERAMIC HONEYCOMB STRUCTURE

BACKGROUND OF THE INVENTION

The present invention relates generally to ceramic honeycomb structures or composites, and more particularly to an improved ceramic honeycomb cell construction having curved walls which are capable of accommodating deformation due to thermal or mechanical stresses in planes normal to the longitudinal axis of the cell.

As used hereinafter, ceramic honeycomb structures or composites refers to a structure comprising a plurality of parallel cells or cellular portions which are defined by interconnected and interrelated partitions to form a body of such cells. Usually, the body of the cells is surrounded by a peripheral wall or skin. Typically, all of the cells, except for those which are adjacent to the skin, are of the same geometry or shape, such as triangles, squares, rhombuses, hexagons, or circles. In order to maximize the exposed surface area contained within the body as a whole, the interconnected and interrelated partitions or walls forming the cells are of minimum thickness, for example, from 0.002 to 0.050 inches.

Such ceramic honeycomb structures have found application as substrates or core members for use in catalytic converters or reactors for treating emissions from internal combustion engines. U.S. Pat. No. 3,783,350 to Dwyer et al. discloses a method of coating such honeycomb substrates with a catalyst for reacting with such emissions. Extrusion methods of making monolithic ceramic substrates useful as catalyst core member are described in U.S. Pat. Nos. 3,790,654 to Bagley and 3,846,197 to Wiley. Dies for use in extruding monolithic substrates are provided in the Bagley patent and in U.S. Pat. No. 3,826,603 to Wiley. Ceramic compositions for catalytic convertor substrates are described in U.S. Pat. No. 3,885,977.

In the operation of catalytic converters, the hot exhaust gases flowing through the cells generate severe non-uniform temperature gradients in directions parallel and normal to the axes of the cells. The gradients established in the latter direction cause very high tangential and radial stresses to be exerted on the substrate and have been recognized as the cause of mechanical failure in the form of cracking or fracturing of peripheral regions of the substrate.

In my paper entitled, "Effects of Cell Geometry on Thermal Shock Resistance of Catalytic Monoliths", (Society of Automotive Engineers paper, No. 750171, February, 1975) various measures for improving the capability of a substrate to withstand thermally induced stresses are described. It is noted therein that the thermal shock resistance of the ceramic honeycomb structure is directly proportional to the coefficient of thermal expansion of the material forming the structure and its mechanical strength in the directions of concern and is inversely proportional to its bulk or structural elastic modulus in such directions. Much effort has been directed in the past to devising compositions and manufacturing processes to produce a substrate having a minimal coefficient of expansion and maximum strength. The development work has been successful, insofar as the ceramic substrates used to date have been found to perform satisfactorily under the conditions existing in the present automotive catalytic devices.

However, it is known that the federal pollution requirements concerning automotive exhaust emissions will be more stringent in the future and more particularly that such future requirements will most likely necessitate conversion at higher temperatures in order to remove nitric oxides from the exhaust gases. In other words, it is expected that the future substrates will be subjected to much higher temperatures. These temperatures will induce more severe thermal gradients which are anticipated to be too great for known prior art substrates to withstand without cracking.

Manifestly, it would be very desirable to be able to utilize prior art compositions and manufacturing techniques in making the substrates which will meet the more stringent requirements. Accordingly, it is an object of the present invention to provide a ceramic honeycomb structure having a cell geometry or shape which will enable the structure to withstand, without mechanical failure or cracking, the thermally induced forces expected to be generated at the higher temperatures, while yet utilizing the same or similar compositions and manufacturing processes employed in making present ceramic honeycomb structures.

It is a major object of this invention to provide a ceramic honeycomb structure with a cell geometry which is capable of deforming in a preinduced manner under stress, whereby stress concentrations at or near the corners of the cells will be minimized.

More particularly, it is an object of the present invention to increase the strain tolerance or thermal shock resistance of a ceramic honeycomb structure or composite by providing such structure with a cell geometry characterized by a lower structural modulus in directions generally parallel to the cell walls and normal to the longitudinal axes of the cells. Collaterally, the present invention contemplates a honeycomb structure or composite having more uniform or nearly isotropic structural elastic moduli in directions contained within planes normal to the longitudinal axes of the cells or cellular portions of the structure.

It is a further object of the present invention to provide a honeycomb structure with a cell shape or geometry including curved walls or partitions, wherein the partitions are curved sufficiently to minimize the anisotropic structural modulus characteristics of straight-sided cell geometries, while yet minimizing the stresses at the ends of the walls or partitions induced by the curvatures of the walls.

SUMMARY OF THE INVENTION

In accomplishing these objects, the present invention provides a ceramic honeycomb structure or composite comprising a plurality of interconnected partitions which together form interrelated cellular portions or cells extending longitudinally through the structure, wherein each of the cells except those at the periphery of the structure are circumscribed by two sets of partitions or walls; the partitions in one of the sets being concavely curved relative to an axis longitudinally extending through the center of each respective cell; the partitions in the other set being convexly curved about the longitudinal axis extending through the center of such cell; and, the overall outline of each respective cellular portion or cell having the shape of a parallelogram or hexagon.

More specifically, in the parallelogram type cells, the partitions which are generally parallel to each other are curved in the same direction, i.e. convex or concave with the convexly curved partitions adjoining at both ends with concavely curved partitions, and vice versa. In this manner, the angles between the partitions are maintained generally the same before and during transverse deformation under tensile or compressive stresses exerted on the cellular portion in planes normal to the longitudinal axis of the cell.

While other embodiments are contemplated as well, it is very suitable to form each of the partitions in the shape of a half sine wave. When the overall shape of the cell is that of a square having two convexly curved walls facing each other and two concavely curved walls in between, the sinusoidal partition shape of only a small amplitude will result in a substantial reduction of the structural elastic moduli in directions generally parallel to straight lines through ends of the walls, thereby making the overall structure more nearly elastically isotropic. By keeping the amplitude at a minimum, the increase in bending stresses exerted at the ends of the walls will be minimized, whereby the strength of the structure will be only relatively slightly reduced. Accordingly, the thermal shock resistance of the cell will be substantially higher than that of a straight-sided cell of similar outline.

It has thus been a major object of the present invention to provide a honeycomb structure having a cell geometry which provides improved thermal shock resistance or increased strain tolerance.

BRIEF DESCRIPTION OF THE DRAWINGS

FIG. 3 is a schematic view representative of a preferred embodiment of this invention, wherein the interconnected partitions forming the cellular portions have the general outline of a modified square.

FIG. 4 is a fragmental schematic view of a single cell or cellular portion of the structure depicted in FIG. 3, and more specifically illustrates a preferred wall curvature of a sinusoidal form.

FIG. 5 is a schematic view representative of another preferred embodiment of this invention, wherein the interconnected partitions form interconnected and interrelated cells of a modified hexagonal shape.

FIG. 6 is a schematic view illustrative of a preferred embodiment of the present invention, wherein each cell has an overall shape of a modified diamond-like parallelogram.

DESCRIPTION OF THE PREFERRED EMBDOIMENTS

Figure 1A:
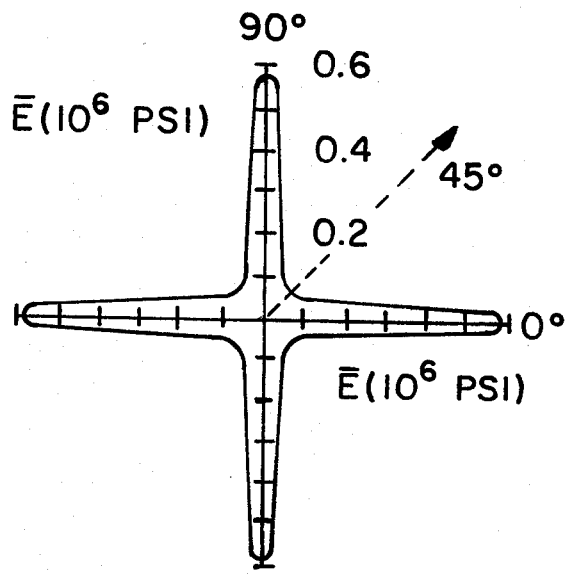
FIG. 1a is a polar diagram of a characteristic curve showing the structural elastic moduli, $\overline{E}$, of such known cellular portion as illustrated in FIG. 1 in the various directions of a cross-sectional or x-y plane of FIG. 1.

Referring now to the drawings, and particularly FIGS. 2 through 6, several embodiments of ceramic honeycomb structures or composites are shown, each comprising a plurality of parallel cellular portions or cells 30–38, 40–44 and 50–60 formed by interconnected and interrelated partitions or walls 20a–20f extending through the structure generally parallel to one direction or axis, z, which is hereinafter referred to as the cell or honeycomb axis. The plurality of cells forming the honeycomb structure are bounded by a peripheral or outer wall or skin 70, which is shown in part in FIG. 3. Preferably, the partitions are relatively thin to maximize the open area in planes normal to the honeycomb axis, that is, in cross-sectional planes containing the x and y axes, hereinafter called cross-sectional planes.

Figure 2A:
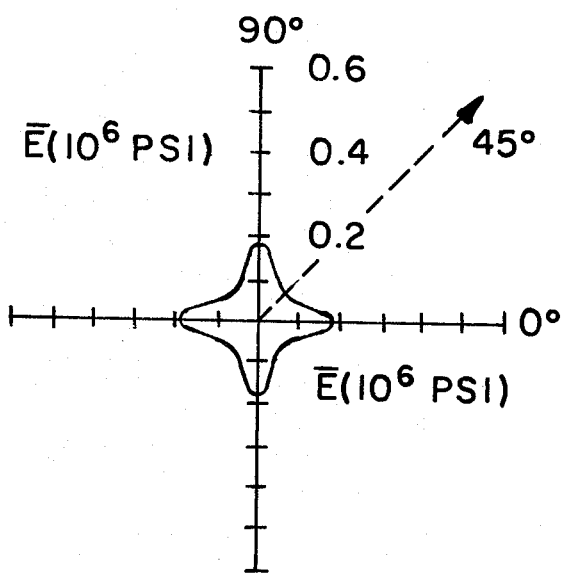
FIG. 2a is a polar diagram of a characteristic curve showing the structural elastic moduli, $\overline{E}$, of the improved honeycomb structure of FIG. 2 in various directions in the cross-sectional or x-y plane.
Figure 2:
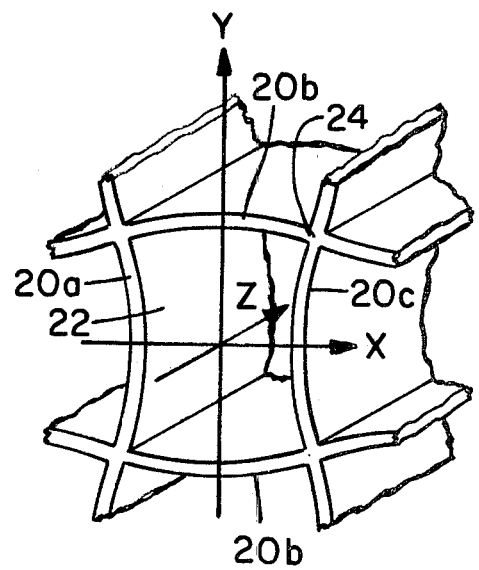
FIG. 2 is a fragmental oblique view depicting a cellular portion of the honeycomb structure of the present invention.

In a first embodiment, shown in FIGS. 2 through 4, each of the cells 30–38 has the overall outline of a modified square; that is, straight lines drawn through junctures or juncture lines 24 of the partitions 20a and 20b of each cell define a square. Each cell 30 through 38 includes a first set of opposing concavely curved partitions 20a and a second set of opposing convexly curved partitions 20b, with the concavely curved partitions 20a connecting with the convexly curved partitions 20b at four junctures 24. That is, both ends of each concave partition 20a adjoin ends of the two convex partitions 20b, and both ends of the convex portions 20b adjoin ends of the concave portions 20a.

The concave partitions or walls 20a oppose each other and are joined at their ends by the convexly curved partitions 20b, which also oppose each other. Each partition has an equal length L, as shown in FIG. 4, which is measured along a direct line from juncture to juncture or end to end of each partition; and the convex and concave partitions have identical curvatures, thus providing four equal corner angles of approximately 90° each at the junctures 24 of the juxtaposed partitions 20a and 20b. As used herein, a corner angle is determined by the intersection of two lines which are tangent to respective adjoining walls at the juncture or intersections of the walls and which lie in the cross-sectional plane. The partitions have a generally uniform thickness which, as previously mentioned is minimized to maximize the open frontal area of each cell 30 through 38. To reduce stress concentrations at the junctures 24, that is at the ends of the partitions, the junctures are preferably filleted or rounded.

As depicted in FIG. 3, the modified square design of each individual cellular portion is incorporated into a symmetrical, repetitive or reoccuring pattern, wherein each cell 30 through 38 is of the same shape, but adjacent cells are angularly displaced 90° relative to each other. That is, each cell, such as cell 30, is identical to the cells 32 through 38 immediately adjacent it, but each of the adjacent cells 32 through 38 are rotated at 90° relative to the common cell 30. It will thus be seen that every other cell in a row of cells, such as cells 38 and 36 or cells 32 and 34 are identical to each other, with the cell in between, such as cell 30, being angularly rotated 90° from such cells at either side thereof.

Another way of defining the repetitive nature of the cross-sectional cell pattern of the honeycomb structure as a whole is that each partition wall is convex with respect to one cellular portion but is concave with respect to the cellular portion common with such partition. For example, partition walls 20a of cell 30 are concave with respect to cell 30; but in the adjacent cells 36 and 38, which are common with cell 30 and share the partitions 20a of cell 30, the partitions 20a are convexly curved with respect thereto. While in cell 30 partitions 20b are convexly curved with respect to the center or longitudinal axis thereof, the same partitions are concavely disposed with respect to the center of the adjacent cells 32 and 34 disposed below and above cell 30, respectively. As is notable from the drawings, only one numeral is used to designate those partitions of a cell which are common with two cells.

A key advantage with the honeycomb construction of the present invention is that during deformation under thermally or mechanically induced stresses, the corner angles, which are approximately 90° in the case of the modified square shape, will remain essentially equal in each respective cell. This result is brought about by the fact that the opposing partitions 20a and 20b, respectively, have preinduced moment arms extending either away from or toward the center of each cell; and during deformation, such preinduced moment arms tend to cause the partitions to bend either toward or away from the center of the cell. Accordingly, forces exerted parallel to the concavely curved partitions will cause the two partitions to bow or flex inwardly; and likewise forces of equal magnitude exerted parallel to the convexly curved partitions will cause these latter partitions to flex outwardly, to thereby maintain the corner angles between the convexly and concavely curved partitions generally equal to their original values. As used herein, the phrase, generally parallel to a partition, refers to a direction taken along a straight line lying in a cross-sectional plane and intersecting the ends of the partition at the junctures or juncture lines 24, for example, along the x axis shown in FIG. 4.

As will be appreciated by those skilled in the ceramic honeycomb composite art, stresses tend to concentrate more at the ends of the partitions as the corner angles formed by the partitions decrease. Such stress concentration is minimized according to this invention by the provision of a honeycomb structure having the foregoing mechanism or means for maintaining the corner angles generally at their original magnitudes or values. In contrast with the known cell geometries of regular straight-sided geometrical shapes, the curved geometry of the present invention causes the structure to deform in a preset or preinduced manner, rather than in an arbitrary manner in which straight or planar partitions will bend or deform under stress. In lieu of, or in addition to, decreasing the expansion coefficient of the ceramic materials comprising the substrate, this means for maintaining corner angles at their original values and the greater cell flexibility of the present invention, as hereinafter discussed, will impart an improved thermal shock resistance to the honeycomb structure.

Another important aspect of the cell geometry described above is that the curved wall construction will result in lower and more uniform structural elastic moduli in directions lying in the cross-sectional planes. This structural elastic modulus characteristic will improve the ability of the structure to withstand radial and tangential stresses, whether such stresses are thermally or mechanically induced.

Figure 1:
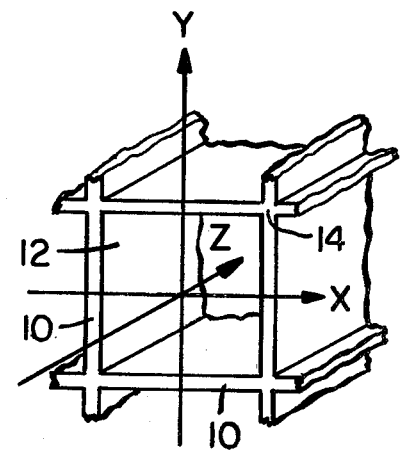
FIG. 1 is a fragmental oblique view illustrating a cellular portion or cell of a honeycomb structure of known type.

As reported in the aforecited S.A.E. paper, the structural elastic modulus, $\overline{E}$, of a square cell of the construction illustrated in FIG. 1 can be determined according to the following equations:

$$\overline{E}_{(\theta=0,90°)} = E\left(\frac{t}{L}\right) \quad (1)$$

and $$\overline{E}_{(\theta=45°)} = \frac{2E}{[(L/t)^3 + (3 + 2\nu)(L/t)]} \quad (2)$$

wherein $\theta$ is the angular displacement from the x axis shown in FIG. 1; E is the elastic modulus of the cell material; L denotes the length of the partition 10; t is the thickness of the partition 10; and $\nu$ is Poisson's ratio. The Poisson's ratio, $\nu$, in the $\theta=45°$ or diagonal direction, is assumed to be 0.90 due to imperfections in cell geometry, such as non-uniform cell thicknesses.

At a thickness or t equal to 0.010 inches and a partition length L equal to 0.070 inches, and an elastic modulus E approximately equal to $4\times10^6$ pounds per square inch, which is typical for conventional monolithic extruded substrates of a cordierite type of ceramic, the structural elastic moduli of a square cellular portion, of the type shown in FIG. 1, using equations (1) and (2), is computed to be $$\overline{E}_{(0, 90°)} = 0.57 \times 10^6 \text{ psi} \quad (3)$$

and $$\overline{E}_{(45°)} = 0.03 \times 10^6 \text{ psi} \quad (4)$$

It will thus be seen that the prior art square cell is highly elastically anisotropic. The structural elastic modulus in directions parallel to the cell walls (equation 3) is nineteen times greater than the structural modulus in the diagonal direction (equation 4). In order to illustrate the anisotropy of the square cell, a characteristic curve plotting the structural elastic moduli in the various directions in the cross-sectional plane is set forth in FIG. 1a.

According to a preferred embodiment of the present invention, as illustrated in FIG. 4, the partitions 20a and 20b may each have a curvature of a half sine wave defined by the equation $$y = e \sin \frac{\pi x}{L} \quad (5)$$

wherein y is the displacement taken in a normal direction from a straight line drawn through the ends of the partition at the junctures 24 (that is, from the x axis in FIG. 4); L is the straight-line distance between the junctures lines 24 or the ends of the partition; and e is the maximum eccentricity or amplitude of the partitions, that is, at the midpoint or a distance of L/2 from either juncture 24. The displacement, y, and the amplitude, e, is measured with reference to the centerline of the partitions, rather than from the inside or outside surfaces thereof. The outline or profile of the partitions schematically illustrated in FIG. 4 is thus an outline of the centerlines of the respective partitions; and the amplitude, e, is the deviation from a straight line, x, drawn through the ends of the centerline of a partition, at the midpoint of the partition or half-way between such ends.

In order to compare the anisotropic elastic characteristics of the present invention with that of the square geometry shown in FIG. 1 and characterized in FIG. 1a, the anisotropic elasticity theory and the energy method used to derive the structural elastic moduli equations (1) and (2) (as set forth in the previously mentioned article) were also used to derive the various structural elastic moduli for the improved cell geometry of the present invention. The modified square configuration of FIGS. 2, 3, and 4 when provided with sinusoidally curved partitions of the shape described in equation (5) have structural moduli defined by the following equations:

$$\bar{E}'_{(\theta=0,90°)} = \frac{E}{\frac{L}{t}\left(1 + 6\frac{e^2}{t^2}\right)} \quad (6)$$

and $$\bar{E}'_{(\theta=45°)} = \frac{2E}{[(L/t)^3 + (3 + 2\nu)(L/t)]} \quad (7)$$

wherein e is the maximum amplitude of sinusoidal curvature, as depicted in FIG. 4; the other parameters are the same as in equations (1) and (2), above; and due to the fact that only small amplitudes of curvature are deemed necessary for the reasons mentioned below, the equation for the structural modulus in diagonal directions is that given by equation (2) above, that is, $\bar{E}'_{(45°)}$ approximately equals $\bar{E}_{(45°)}$.

Assuming the wall thickness t to be equal again to 0.010 inches, the wall length L to again equal 0.070 inches, the structural elastic moduli in the directions generally parallel to the walls for various values of e/t (that is, for the ratios of amplitude over wall thickness) are as follows:

TABLE I

| $\frac{e}{t}$ | $\bar{E}'_{(\theta=0,90°)}$ |
|---|---|
| 0 | 0.57 × 10⁶ psi |
| 0.2 | 0.46 × 10⁶ psi |
| 0.4 | 0.29 × 10⁶ psi |
| 0.6 | 0.18 × 10⁶ psi |
| 0.8 | 0.12 × 10⁶ psi |
| 1.0 | 0.082 × 10⁶ psi |
| 1.2 | 0.059 × 10⁶ psi |
| 1.5 | 0.039 × 10⁶ psi |

The preceding Table illustrates that at an amplitude of 0, that is, when the partitions are straight, the structural modulus is, as indicated above in equation (3), equal to 0.57×10⁶ psi. Surprisingly, at a ratio of amplitude to thickness equal to 1.5, the structural elastic modulus decreases to 0.039×10⁶ psi. This represents an improvement in structural modulus of over an order of magnitude.

However, as noted above, the thermal shock resistance is not only inversely proportional to the structural modulus, but also directly proportional to the strength of the structure in the direction of concern. Therefore, it is also necessary to consider the increase in bending stresses generated at the ends of the partitions near the junctures 24 as a result of the moment arms incorporated into the partitions by their curved shape. The relationship between the bending moments of conventional square cells and those of the present invention may be expressed as follows:

$$\frac{M_o \text{ curved}}{M_o \text{ straight}} = 1 + \frac{4e}{\pi L} \cot \alpha \quad (8)$$

wherein $M_o^{curved}$, is the bending moment at the end portions of the curved partitions of the sinusoidal form; $M_o^{straight}$ denotes the bending moment at the ends of straight partitions of the conventional square cells as shown in FIG. 1; e and L are as above; and α is the angular displacement between a tangent s to the curve of the partition at the juncture 24 or end thereof, and a line d drawn through such end of the partition and the opposing juncture, as shown in FIG. 4. Solving for this ratio at values of α=π/4, e equal to 0.006 inches and L equal to 0.070 inches, $$\frac{M_o \text{ curved}}{M_o \text{ straight}} = 1.1 \quad (9)$$

Referring to equation (9) and Table I, it will be appreciated that at such amplitude of 0.006 inches and wall thickness of 0.010 inches the structural elastic modulus in directions parallel to the cell wall will be 0.18×10⁶ psi, representing a reduction in structural elastic modulus from that of a straight wall by factor of 3. Yet, the increase in bending stress at the ends of the partitions will only be ten percent. Hence as a rough approximation, it may be stated that the modified square cell geometry having sinusiodally curved partitions whose amplitudes are 6/10 of the wall thickness will result in at least a doubling of the thermal shock resistance of the structure in comparison with that of the conventional square cell geometry.

Moreover, the cell geometry of the present invention yields a great improvement in the anisotropic structural modulus characteristics of a ceramic honeycomb substrate. For example, as just stated, at the aforementioned wall thickness of 0.010 inches and an eccentricity of 0.006 inches, Table I indicates a structural modulus of 0.18×10⁶ psi in directions parallel to the cell walls. Utilizing equation (7), the structural modulus in the diagonal direction for the modified square shape having such thickness and eccentricity will be 0.03×10⁶ psi. Using these values, FIG. 2a illustrates the improvement in the uniformity of structural elastic modulus due to the reduction of elastic modulus in the 0, 90° 180° and 270° directions which results from incorporating a sinusoidal wall curvature having an amplitude equal to 6/10 the wall thickness. The reduction in maximum elastic modulus is thus on the order of 67%, in other words, by a factor of 3. Whereas the values of structural modulus in the diagonal and parallel-to-wall directions of the straight-sided square cell differ by a factor of 19, the same values for the modified square geometry of the present invention differ by a factor of 6. Hence, the anisotropy in structural elastic modulus is improved by a factor of 19/6, that is, also by a factor of approximately 3.

Another embodiment of the improved honeycomb structure of the present invention, illustrated schematically in FIG. 5, has a modified hexagonal cell shape.; that is, straight lines drawn through next adjacent junctures or juncture lines 24' of each of the cells define a hexagon. The first set of concavely curved partitions or walls includes three non-opposing partitions 20c; while the second set of convexly curved partitions includes three non-opposing partitions 20d. The concavely curved partitions 20c are separated from each other and their ends adjoin the ends of convexly curved partitions 20d. That is, the ends of each of the concave walls 20c are connected to ends of convex walls 20d; and the ends of each convex wall 20d adjoin ends of concave walls 20c. The partitions are of equal length and curvature, with each of the junctures 24' being equidistant and equiangularly spaced from its two adjacent junctures. The orientations and curvatures of the convexly and concavely curved partitions results in equal angles of 120° being formed between the end portions of the partitions.

As shown in FIG. 5, the cells 40, 42 and 44 are oriented with respect to each other to form a repetitive or reoccurring symmetrical pattern, wherein partitions which are concavely curved with respect to one cell (such as partition 20c with respect to cell 40) are convexly curved with respect to the cell sharing such partition (such as cell 42). The cells are identical to each other, with adjacent cells being rotated by an amount equal to the corner angles of the cells, that is, in the amount of 120°. This rotational relationship between the cells is illustrated by cells 40, 42 and 44 of FIG. 5, wherein the cells are rotated about a common juncture 24'. The hexagonal cells in any one row, such as cells 40 and 42, will thus be oriented relative to each other such that the partitions transverse to the direction of the row are curved in the same direction.

In yet another embodiment, illustrated in FIG. 6, the cells have a modified diamond or rhomboid shape. In this embodiment, there are two partitions each in the first and second sets with each of the two concavely curved partitions 20e opposing each other and adjoining at their ends with two opposing convexly curved partitions 20f. The partitions are all of equal length, as measured from end to end, and of identical curvature. Two of the corner angles which oppose each other are approximately 60°, and the other opposing angles are approximately 120°. As above, the corner angles are defined by the intersection of tangents to adjoining walls which intersect at the junctures 24" and which lie in the cross-sectional plane.

When incorporated into a honeycomb structure as a whole, such modified diamond shaped cells will intermesh with each other in a manner that any one partition, except at the periphery of the structure, is concavely partitioned with respect to one cell but is convexly curved with respect to the adjacent or contiguous cell (that is, the cell which is common to the partition). This pattern will appear to have groups of three identical cells clustered about a central juncture; for example, cells 50, 52 and 54 are clustered about one juncture 24''', and cells 56, 58 and 60 are centered about another juncture 24''. Alternatively, the overall pattern of the cells may be described as comprising a plurality of groups of six identical cells each clustered about a common juncture; for example, cells 52, 54, 56 and 58 are four of the six cells forming such a six cell cluster.

The modified hexagonal and diamond shaped cells of FIGS. 5 and 6 yield the same advantages as described above in connection with the modified square shape. During deformation under thermally or mechanically induced stresses, the angles between the adjoining partitions will tend to remain generally equal to their original values, whereby stress concentrations at the ends of the partitions will be minimized. Also due to the curved partition construction, the modified hexagonal and diamond shaped cells will have substantially more flexibility in directions generally parallel to the walls or partitions thereof.

To minimize the bending stresses at the ends of the partitions which occur as a result of providing curvature in the walls, but to still provide low uniform structural moduli, it is preferable that the partitions be sinusoidally curved. More specifically, it is desirable that the sinusoidally shaped partitions have an amplitude, e, calculated to substantially reduce the structural elastic modulus of the cell structure in directions generally parallel to the cell walls, but not to substantially increase the bending stresses associated with the increased moment arms of the curved partition shape. It will be noted in connection with the modified hexagonal shape that sinusoidal curvatures of very small amplitude will result in making the cell geometry essentially elastically isotropic; this results from the fact that straight-walled hexagonal structures are much less anisotropic than structures of parallelogram forms.

Although the invention has been described in connection with ceramic types of honeycomb structures suitable for use in automotive catalytic converters, it will be recognized that the ceramic honeycomb structure may be advantageously employed in other applications which require a high strain tolerance or a high thermal shock resistance. Accordingly, it is not intended that the present invention be limited to ceramic honeycomb structures or composites which are used as catalyst core members.

While the invention has been described in connection with possible forms or embodiments thereof, it is to be understood that the present disclosure is illustrative rather than restrictive and that changes and modifications may be resorted to without departing from the spirit of the invention or scope of the claims which follow.

I claim:

1. In a ceramic honeycomb structure including a plurality of interrelated cells of identical shapes formed by interconnected partitions extending through the structure parallel to a honeycomb axis to form in cross-sectional planes normal to the honeycomb axis a reoccurring pattern of cells, a cell construction which is relatively uniform in structural elasticity in said cross-sectional planes and which deforms in a preinduced manner under stresses exerted in the cross-sectional planes, said cell construction comprising: a plurality of curved partitions having a sinusoidal shape along their extent, said curved partitions being interconnected at junctures to form a plurality of adjacent cells; each said cell having a longitudinal axis extending through the center thereof; said partitions being alternately convexly and concavely curved about the longitudinal axis of the cell; each of said convex and concave partitions having the shape of a half sine wave; each said half sine wave having amplitude means for minimizing the structural elastic modulus anisotropy in directions lying in said cross-sectional planes and for minimizing the bending stresses at end portions of said interconnected partitions adjacent said junctures; said curved partitions having a selected thickness; and said amplitude means including an amplitude of said half sine wave which is less than said selected thickness.

2. In a ceramic honeycomb structure including a plurality of interrelated cells extending longitudinally through the structure generally parallel to a honeycomb axis, with each of said cells being circumscribed by partitions which in a cross-sectional plane normal to the honeycomb axis define a geometrical shape, and with the cells together forming a reoccurring symmetrical pattern in said cross-sectional plane, the improvement comprising: each of said cells having a first set of concavely curved partitions and a second set of convexly curved partitions; said convexly curved partitions adjoining at both ends with said concavely curved partitions; said concavely curved partitions adjoining at both ends with said convexly curved partitions; each of said cells having an overall shape of a modified parallelogram having concavely curved partitions forming two opposing sides thereof and convexly curved partitions forming the remaining two opposing sides thereof; said curved partitions extending along said cross-sectional plane and having a sinusoidal shape along their extent; said sinusoidal partitions having a defined thickness; and the sinusoidal shape of said partitions having an amplitude which is less than said selected thickness of said partitions.

3. In a ceramic honeycomb structure including a plurality of interrelated cells extending longitudinally through the structure generally parallel to a honeycomb axis, with each of said cells being circumscribed by partitions which in a cross-sectional plane normal to the honeycomb axis define a geometrical shape and with the cells together forming a reoccurring symmetrical pattern in said cross-sectional plane, the improvement comprising: each of said cells having a first set of concavely curved partitions and a second set of convexly curved partitions; said convexly curved partitions adjoining at both ends with said concavely curved partitions; said concavely curved partitions adjoining at both ends with said convexly curved partitions; each of said cells having an overall shape of a modified square having two opposing partitions which are convexly curved and two opposing partitions which are concavely curved; said curved partitions extending along said cross-sectional plane and forming a sinusoidal shape having amplitudes for reducing the maximum structural elastic modulus of said cells in said cross-sectional plane without substantially increasing the bending stresses at the ends of the partitions; said curved partitions having a defined thickness; and said amplitudes for said curved partitions not being greater than said defined thickness of said partitions.

* * * * *